(12) United States Patent
Johnson et al.

(10) Patent No.: US 6,512,804 B1
(45) Date of Patent: Jan. 28, 2003

(54) APPARATUS AND METHOD FOR MULTIPLE SERIAL DATA SYNCHRONIZATION USING CHANNEL-LOCK FIFO BUFFERS OPTIMIZED FOR JITTER

(75) Inventors: David T. Johnson, Leucadia, CA (US); Steven G. Robalino, Austin, TX (US)

(73) Assignee: Applied Micro Circuits Corporation, San Diego, CA (US)

( * ) Notice: Subject to any disclaimer, the term of this patent is extended or adjusted under 35 U.S.C. 154(b) by 0 days.

(21) Appl. No.: 09/288,000

(22) Filed: Apr. 7, 1999

(51) Int. Cl.[7] .................... H04L 25/36; H04L 25/40; H04L 7/00
(52) U.S. Cl. .................... 375/372; 375/355; 375/373; 710/61; 713/400; 370/907
(58) Field of Search ................. 375/371–373, 375/354, 355, 357, 375, 376; 370/350, 503, 516–519, 907, 328, 413–415; 713/400, 401; 327/141, 144, 153, 161; 710/58, 59, 61

(56) References Cited

U.S. PATENT DOCUMENTS

| | | | |
|---|---|---|---|
| 4,759,014 A | * | 7/1988 | Decker et al. .............. 370/503 |
| 4,996,698 A | | 2/1991 | Nelson ....................... 375/118 |
| 5,461,622 A | * | 10/1995 | Bleickardt et al. .......... 370/470 |
| 5,502,750 A | | 3/1996 | Co et al. .................... 395/372 |
| 5,548,534 A | | 8/1996 | Upp ......................... 364/514 R |
| 5,598,445 A | | 1/1997 | Castano Pinto et al. .... 375/372 |
| 5,602,882 A | | 2/1997 | Co et al. .................... 375/372 |
| 5,790,538 A | | 8/1998 | Sugar ........................ 370/352 |
| 5,793,770 A | | 8/1998 | St. John et al. ............. 370/401 |
| 5,796,795 A | | 8/1998 | Mussman et al. .......... 375/372 |
| 5,812,618 A | | 9/1998 | Muntz et al. ............... 375/354 |
| 5,818,890 A | | 10/1998 | Ford et al. .................. 375/371 |
| 5,822,383 A | | 10/1998 | Muntz et al. ............... 375/362 |
| 5,872,789 A | | 2/1999 | Orleth et al. ............... 370/517 |

OTHER PUBLICATIONS

"JITTER—In Digital Transmission Systems", Patrick R. Trischitta & Eve L. Varma, Artech House, pp. 1–10, 97, 103–141, 175, 193–215, 1989.

* cited by examiner

Primary Examiner—Phuong Phu
(74) Attorney, Agent, or Firm—Gray Cary Ware & Freidenrich; Terrance A. Meador

(57) ABSTRACT

The invention provides an apparatus, and related method, for receiving and synchronizing parallel data transmitted over multiple serial data channels. The synchronization technique uses a channel lock FIFO buffer on each received serial data channel. The FIFO buffers are configured to tolerate a significant amount of jitter between channels and clock tree delay within the synchronization apparatus.

7 Claims, 2 Drawing Sheets

APPARATUS AND METHOD FOR MULTIPLE SERIAL DATA SYNCHRONIZATION USING CHANNEL-LOCK FIFO BUFFERS OPTIMIZED FOR JITTER

BACKGROUND OF THE INVENTION

The present invention relates to digital communications, and more particularly, to synchronization of parallel data transmitted over multiple serial channels.

The data rate of a stream of parallel data may exceed the serial data rate capacity of many existing telecommunications carrier channels. Accordingly, multiple serial channels are used to accommodate the higher parallel data rate. For example, synchronized serial digital data transmission channels such as those based on the SONET standard, may provide several serial channels that are frequency locked. However, each serial channel uses a separate optical fiber so each channel may have differing time delays, wander or the like for each of the serial channels. Thus, even though the serial channels are frequency locked, the individual channels have varying phase, jitter and skew. Accordingly, the digital data must be resynchronized at the receiving end. Existing systems generally resynchronize the digital data using high speed digital circuits operating at the serial data rate. Also, the digital circuits often includes complicated smoothing or averaging circuits for reducing jitter and the like.

Accordingly, there exists a need for a data resynchronization technique that is economical and that can operate using digital circuitry operating at a clock speed that is a fraction of the serial data rate. The present invention satisfies these needs and provides further related advantages.

SUMMARY OF THE INVENTION

The present invention is embodied in an apparatus, and related method, for synchronizing parallel digital data transmitted across a plurality of serial data channels. The apparatus includes a plurality of regenerators, a clock tree and a plurality of FIFO buffers each associated with a regenerator. The plurality of regenerators receive serial data from the plurality of serial data channels, respectively. The FIFO buffers are optimized for jitter. Each regenerator generates parallel data and a data clock based on the serial data from the respective serial data channel. The clock tree generates a synchronous clock for synchronizing the parallel data. Each FIFO buffer stores the respective parallel data based on the respective data clock. The parallel data is read from the FIFO buffer based on the synchronous clock.

In more detailed features of the invention, each FIFO buffer includes a data store, a synchronous repetitive counter, a demultiplexer, a data repetitive counter and a multiplexer. The data store has a plurality of parallel data locations for storing the parallel data in response to a location select signal and for writing the parallel data in response to a write select signal. The synchronous repetitive counter generates a synchronous count for incrementally selecting each data location based on the synchronous clock. The demultiplexer is coupled between the synchronous counter and the plurality of storage locations for enabling a selected location to store the parallel data using the select signal which is generated by the demultiplexer based on the synchronous count. The data repetitive counter generates a data count for incrementally selecting each data location based on the data clock. The multiplexer is coupled between the data counter and the plurality of storage locations for reading the parallel data of a data location selected based on the data count. The synchronous counter is configured to count about 180 degrees out of phase with the count of the data counter in the absence of jitter between the synchronous clock and the data clock so that the synchronizing apparatus is optimized for jitter.

Other features and advantages of the present invention should become apparent from the following description of the preferred embodiments, taken in conjunction with the accompanying drawings, which illustrate, by way of example, the principles of the invention.

DETAILED DESCRIPTION OF THE PREFERRED EMBODIMENTS

The present invention provides apparatus, and related method, for receiving and synchronizing parallel data transmitted over multiple serial data channels. The synchronization technique uses a channel lock FIFO buffer on each received serial data channel. The FIFO buffers are configured to tolerate a significant amount of jitter between channels and clock tree delay within the synchronization apparatus. In addition, the channel-lock FIFO buffers allow the synchronization apparatus to use, for a substantial portion of the synchronization apparatus, logic circuits that operate at a data rate that is substantially below the data rate of the serial channels thus providing increased bandwidth. Accordingly, the synchronization apparatus of the invention provides significant improvements and cost reduction in the design of SONET, Fibrechannel, Gigabit Ethernet, Serial Backplane, Proprietary Point to Point Physical Layer communication channels.

Figure 1:
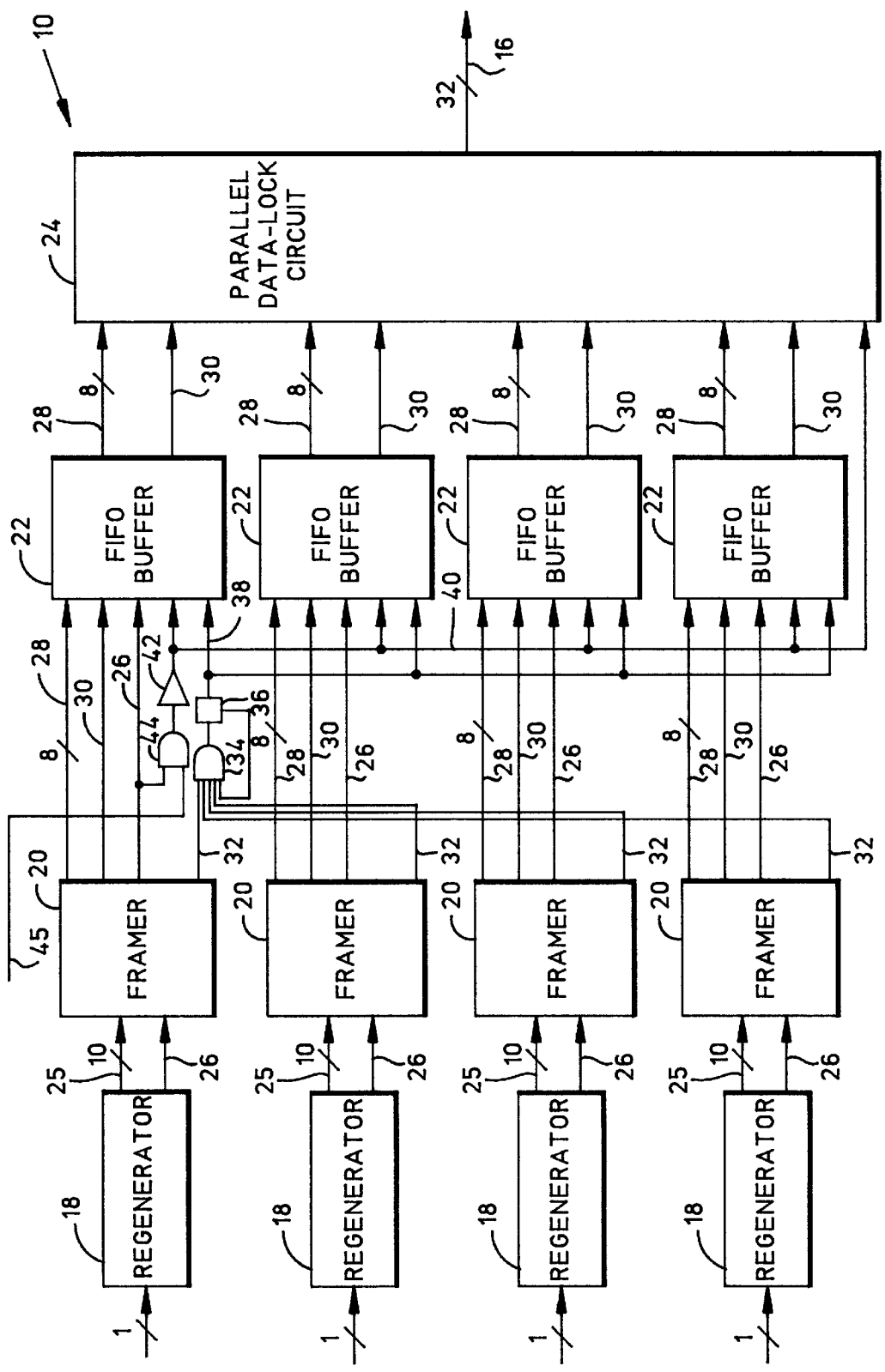
FIG. 1 is a block diagram of a synchronization apparatus using channel-lock FIFO buffers, according to the invention.

A synchonization apparatus of the present invention may be embodied in a synchronization receiver 10 shown in FIG. 1. The receiver's input 12 has four serial channels 14 and its output 16 consists of a word of parallel data. Serial data on the four serial channels are frequency locked, but have arbitrary phase, jitter, and skew. For each input channel, the receiver has an analog-to-digital regenerator 18, a framer 20 and a channel-lock first-in-first-out (FIFO) buffer 22. The outputs of the FIFO buffers are combined into the output word by a parallel-data-lock circuit 24.

The synchronization receiver 10 provides four levels of data synchronization. The first level or data synchronization is provided by the channel regenerators 18. Each channel regenerator has a phase-locked loop (PLL) and a high-speed serial-to-parallel converter. The regenerator receives differentially-encoded analog signals and generates, using the PLL, a clock signal 26 for sampling the analog signal. The PLL is a standard PLL which locks to a frequency reference until data lock on the channel's incoming serial data stream is acquired. After data lock is achieved, a high speed serial shift register outputs non-framed parallel 10-bit data signal 28 to the following low-speed digital logic circuits 20, 22 and 24. Converting the serial data stream into parallel data enables the remaining digital circuits of the synchronization receiver to use of lower speed digital circuits. The parallel data signals and the clock signals generated by the regenerator represent the first level of synchronization.

The framer 20 for each channel 14 receives the parallel data signals 25 and the clock signal 26 from the corresponding regenerator 18 and further generates a frame pulse 30 and a reset signal 32. The reset signal indicates that a framer is receiving clocked data. The reset signal from each channel framer is provider to a gate 34 and an edge circuit 36 that generates a buffer reset signal 38 for insuring that all channels are receiving data before enabling the FIFO buffers 22. The signals provided by the framers represent the second level of synchronization. The framer provides the second level of data synchronization by generating the frame pulse that aligns the data to a framing pattern which may occur anywhere in the high speed serial data stream on each channel.

Several methodologies may be used to achieve the first two levels of synchronization. For example, to provide a 40-bit word transmitted on 4 separate 1.25 GHz Fibrechannel links, 4 physical layer Fibrechannel chips, part number AMCC S2052 available from Applied Micro Circuits Corporation (AMCC) of San Diego, Calif., may be used.

The signals 26, 28, 30 and 38 from the four framers are provided to the corresponding FIFO buffers 22. The FIFO buffers are optimized for jitter. Each FIFO receives data from the corresponding framer in accordance with the clock 26 from the corresponding framer. The clock for one of the channels is selected as a synchronous clock 40, which is provided by a clock tree 42 to each FIFO buffer and to the lock circuit. Alternatively, for a serial backplane or similar application, a clean local clock may be used for the synchronous clock.

The strategic placement of the channel-lock FIFO within the receiver 10 provides the ability to power down the complete channel-lock portion of the receiver using a single "AND" gate 44 and power signal 45 before the clock tree 42. Also, the architecture allows automatic initialization of the channel-lock FIFO buffers 22, by using the AND gate 34 and the edge circuit 36 to receive the reset signals 32 from the framers and deassert a counter initialization signal 38 (reset_n_clf) when all of the PLLs are locked to data.

The channel lock FIFO buffers 22 of the invention are capable of tolerating significant amounts of jitter between channels 14 and differences in on-chip clock tree delay. Further, using the channel lock FIFO buffers allows for scalable design for the next level of synchronization in the lock circuit 24 which allows for reduction of a significant amount of cable skew using a deskewing shift register.

Figure 2:
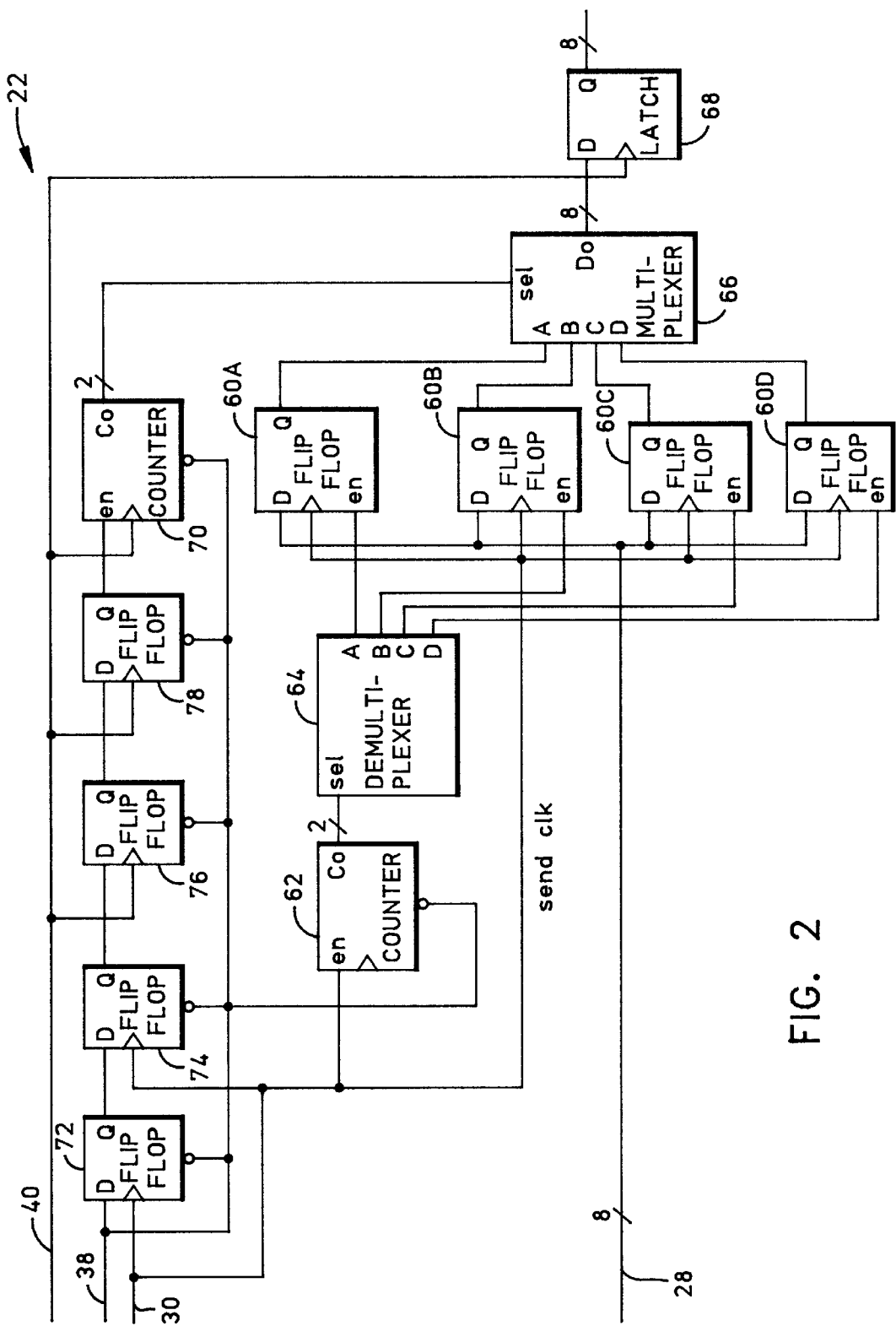
FIG. 2 is a block diagram of a channel-lock FIFO buffer of the synchronization apparatus of FIG. 1, optimized for jitter according to the invention.

As shown in FIG. 2, the FIFO's are optimized for jitter. The channel-lock FIFO buffers have four synchronous D flip-flops 60A–D for receiving 8-bit data on the data line. Although the FIFO buffer shown has a depth of four data flip-flops, additional data flip flops may be added to increase the jitter tolerance of the FIFO buffers. Only one data flip-flop at a time receives data from the data line 28 in accordance with a count in a send counter 62. The send counter is a 2-bit counter that increments in response to each send clock pulse. Thus, the send counter increments four steps from zero to three, repetitively. The send count is provided to a demultiplexer 64 which enables one of the data flip-flops 60. For example, when the send count is zero, data flip-flop 60A is selected. When the send count is one, data flip-flop 60B is selected, etc. The outputs of the data flip-flops are connected to a multiplexer 66 that selects one of the four inputs A–D for transmission to a latch 68 in accordance with a count in a receive counter 70. The receive counter is a 2-bit counter that increments in response to each receive clock pulse. Thus, the receive counter increments from zero to three, repetitively. Further, the receive counter is set so that its count is about 180 degrees out of phase with the count of the send counter. Thus, when the send count is at zero, the receive count is set to two However, because of circuit delays, the receive count is advantageously incremented by one and set to three when the send count is zero. Further, the phasing of the send counter and the receive counter may be scaled to greater FIFO buffer depths in accordance with the formula rcv_cnt=(depth/2)+1. For example, if the FIFO buffer has eight data flip-flops, the receive count would be initialized to five.

The counters 62 and 70 are initialized by the reset signal 38 (rst_n). The reset signal also clears four delay flip-flops 72, 74, 76 and 78 that are used for enabling the counters when the reset signal is not asserted. When the reset signal is asserted, the delay flip-flops are set to one in accordance with clocking from the send clock.

Existing FIFO buffers are generally configured for jitter reduction or optimized for latency. The jitter reduction FIFO buffers have relatively complicated additional filtering or smoothing components for reducing jitter. Latency optimized FIFO buffers have its receive counter closely following its send counter.

Using the channel-lock FIFO buffers 20 allows for a synchronous and scalable design for the 4th level of synchronization, which can then be synthesized using a standard silicon compiler. Scalability at this fourth level of synchronization allows tolerance of a significant amount of cable skew in the deskewing shift register of the lock circuit 24.

As mentioned before, four levels of synchronization are required to reliably provide parallel data transmitted serially over multiple channels. In an alternative embodiment of the invention, the third level of synchronization is provided by a synchronization apparatus 10' having a channel-lock FIFO buffer. The synchronization apparatus is not limited to any specific number of channels or parallel data bits so that N channels may be used to transmit M bits parallel data where N and M are integer values selected in accordance with the available serial data channels and the parallel data to be transmitted. For N serial channels, N PLLs with N serial shift registers are required. The low-speed digital circuits after the shift registers operate at 1/M times the bit rate of the high speed serial shift register. Each channel is frequency locked but generates a large amount of jitter. The data from the channels are synchronously clocked and output as one N*M bit word. As an example, a 40 bit word of parallel data may be transmitted across 4 channels that are each able to accommodate 10 bits of the data. Accordingly, N=4 and M=10. The output of the channel-lock FIFO buffers represent one N*M (40) bit word of data synchronously clocked by the same clock. The N groups of M-bit data are not necessarily framed on an N*M bit word boundary. Framing at the word boundary is accomplished at the fourth level of synchronization.

The fourth level of synchronization uses a scalable deskewing shift register, and associated channel lock pattern recognition logic. The output of the scalable deskewing shift register is synchronous N*M bit framed data operating at a data rate of 1/M. Viewing synchronization 1–4 logic as one N*M channel, the aggregate increase in bandwidth for the level 1–4 logic is N*M.

An algorithmic description of the channel-lock FIFO buffers used in the synchronization apparatus 10' of the invention for receiving data over four serial data channels is provided below in Verilog HDL (Hardware Description Language). The following example combines 4 channels (a,b,c, & d) of level 2 synchronized data. All 4 FIFO buffers are clocked by recovered_clk_a_gt, the output of a clock tree which is frequency locked to the recover clock of channel a, recovered_clk_a, although the recovered clock of any of the other three channels b, c or d may be selected. Squelching the recovered clock signal powers down a significant portion of the logic in the channel-lock FIFO buffers, and all level 4 synchronization circuits which are also clocked by recovered_clk_a_gt. As is readily apparent to one skilled in the art, generalization to N channels requires N instantiations of "fifo_$_r$" below. Note that the FIFO buffers described below is optimized for jitter, not latency, and can tolerate plus or minus (depth_r−1) /2 parallel clocks of jitter where depth_r is the number of storage locations needed to accommodate the anticipated skew, wander, and the like. As an example, a serial data rate of 1.25 Ghz will generate 10 bits of parallel data every 8 nanoseconds. The FIFO buffers can tolerate plus or minus 12 nanoseconds of clock wander (typically less than 6 nanoseconds) and jitter (typically less than plus or minus 3 nanoseconds).

With zero jitter, the latency of the FIFO buffers is approximately N/2 parallel clocks. This equal partioning of the latency allows for maximum jitter about the "average" zero jitter latency. The "reset_clf_n" signal is a logical "AND" combination of the "Lock to Data" signals generated by the N PLLs. This technique accomplishes automatic initialization of the Channel-Lock FIFO counters using a single N input AND gate. Thus, when all of the N PLLs are locked to data, a fixed phase relationship exists between the data and each channel's PLL. At this time, the reset signal is deasserted and the channel lock FIFO buffers are initialized to tolerate the maximum jitter possible for the "depth_r" parameter. Verilog Code Describing Channel Lock FIFO Synchronization Copyright David T. Johnson & Steve Robalino Oct. 6, 1997.

```
//For Channel Locked Mode, 4 Receive FIFOs go Here
parameter width_r= 11;   //Data bus width
parameter depth_r= 4;   //Each increase of 2 can tolerate
                        //an additional parallel clock of
                        // jitter. Need asynchronous
                        // handshake to be + to + if this
                        // number is odd.
parameter count_wdth_r = 2; // 2^count_wdth_r = depth_r
fifo_r # (width_r,depth_r,count_wdth_r)
    fifo_r_a (
        .rst_n (reset_clf_n),
        .snd_clk (recovered_clk_a),
        .rcv_clk (recovered_clk_a_gt),
        .datain({eofd_a0,kflagd_a0,errd_a0,rdataout_a0}),
        .dataout({eofd_fifo_a,kflagd_fifo_a,errd_fifo_a,
        rdataout_fifo_a})
    );
fifo_r # (width_r,depth_r,count_wdth_r)
    fifo_r_b (
        .rst_n (reset_clf_n),
        .snd_clk (recovered_clk_b),
        .rcv_clk (recovered_clk_a_gt),
        .datain({eofd_b0,kflagd_b0,errd_b0,rdataout_b0}),
        .dataout({eofd_fifo_b,kflagd_fifo_b,errd_fifo_b,
        rdataout_fifo_b})
    );
fifo_r # (width_r,depth_r,count_wdth_r)
    fifo_r_c (
        .rst_n (reset_clf_n),
        .snd_clk (recovered_clk_c),
        .rcv_clk (recovered_clk_a_gt),
        .datain({eofd_c0,kflagd_c0,errd_c0,rdataout_c0}),
        .dataout({eofd_fifo_c,kflagd_fifo_c,errd_fifo_c,
        rdataout_fifo_c})
    );
```

-continued

```
fifo_r # (width_r,depth_r,count_wdth_r)
    fifo_r_d (
        .rst_n (reset_clf_n),
        .snd_clk (recovered_clk_c),
        .rcv_clk (recovered_clk_a_gt),
        .datain({eofd_d0,kflagd_d0,errd_d0,rdataout_d0}),
        .dataout({eofd_fifo_d,kflagd_fifo_d,errd_fifo_d,
        rdataout_fifo_d})
    );
module fifo_r (
    rst_n,
    snd_clk,
    rcv_clk,
    datain,
    dataout
    );
/////////////////////////////////////////////////
// Passed parameters
parameter width = 11; // fifo bus width
parameter depth = 4;  // fifo depth
parameter count_width = 2; // 2 bit counter (depth =
2^count)
/////////////////////////////////////////////////
input snd_clk; // send clock (write operation)
input rcv_clk; // receive clock (read operation)
input rst_n; // active-low asynchronous reset
input [(width-1):0] datain; // data to be written into
FIFO
output [(width-1):0] dataout; // data to be read from
FIFO
/////////////////////////////////////////////////
fifo # (width,depth,count_width)
    fifo_i
        .rst_n (rst_n),
        .snd_clk (snd_clk),
        .rcv_clk (rcv_clk),
        .datain (datain),
        .dataout (dataout)
        );
endmodule
module fifo(
    rst_n,
    snd_clk,
    rcv_clk,
    datain,
    dataout);
/////////////////////////////////////////////////
// Passed parameters
parameter width = 4; // default width is 4
parameter depth = 4; // default depth is 4
parameter count_width = 2; // default count is 1
// Calculated parameters
parameter cnt_max = depth-i; //
parameter rcv_init = (depth/2) +1; // This optimizes the
        //FIFO for jitter only if "depth" is even! If
        //depth is odd need to use + to + asynchronous
        //handshake below and set rcv_init = depth/2
/////////////////////////////////////////////////
input snd_clk; // send clock (write operation)
input rcv_clk; // receive clock (read operation)
input rst_n; // active-low asynchronous reset
input [(width-1):)] datain; //data to be written into
FIFO
output [(width-1):0] dataout; //data to be read from FIFO
/////////////////////////////////////////////////
//declare internal registers
integer clr_ctr;
reg sync_write_flag,s_rst_n,idle,s_s_rst_n;
//fifo registers
reg [(width-1) :0] fifo_word[0: (depth-1)];
reg [(width-1) :0] dataout;
//fifo counters
reg [count_width-1:0] snd_cnt;
reg [count_width-i:0] rcv_cnt;
// Sync reset -this becomes the write enable after power
up
always @ (posedge snd_clk or negedge rst_n)
begin
    if (~rst_n)
```

-continued

```
    begin
        s_rst_n <=0;
        s_s_rst_n <= 0;
    end
    else
    begin
        s_rst_n <=rst_n;
        s_s_rst_n <= s_rst_n
    end
end
//Store data into first fifo register
always @ (posedge snd_clk or negedge rst_n)
begin
    if (~rst_n)
    begin
        snd_cnt <= 0;
        for (clr_ctr = 0; clr_ctr <=rcv_init; clr_ctr = clr_ctr + 1)
            fifo_word[clr_ctr] <= 0;
    end
    else
    begin
        if ((snd_cnt == cnt_max) & (s_s_rst_n == 1'b1))
            snd_cnt <= 0;
        else if (s_s_rst_n == 1'b1) //start writing into data registers
            snd_cnt <= snd_cnt + 1;
            fifo_word[snd cnt] <= datain;
    end
end
//Synchronize to the other clock domain
//Both posedge and negedge are used - metastability response must be checked
always @ (negedge rcv_clk or negedge rst_n)
begin
    if (~rst_n)
        sync_write_flag <= 0;
    else
        sync_write_flag <= s_s_rst_n; //detect a write of first register
end
//Move data
//Notify receive end of data valid with 'Idle'
always @ (posedge rcv_clk or negedge rst_n)
begin
    if (~rst_n)
    begin
        dataout <= 0;
        idle <= 0;
        rcv_cnt <= rcv_init;
    end
    else
    begin
        idle <= sync_write_flag;
        if ((rcv_cnt == cnt_max) & idle)
            rcv_cnt <= 0;
        else if (idle)
            rcv_cnt <= rcv_cnt + 1;
        if (idle)
            dataout <= fifo_word[rcv_cnt];   //move the data to
                                             //the next register
    end
end
endmodule
//Verilog Code
//Copyright David T. Johnson & Steven G. Robalino,
//Oct. 6, 1997.
```

While the foregoing has been with reference to specific embodiments of the invention, it will be appreciated by those skilled in the art that these are illustrations only and that changes in these embodiments can be made without departing from the principles of the invention, the scope of which is defined by the appended claims.

What is claimed is:

1. Apparatus for synchronizing parallel digital data transmitted across a plurality of serial data channels, comprising:
   a plurality of regenerators for receiving serial data from the plurality of serial data channels, respectively, each regenerator generating parallel data and a data clock based on the serial data from the respective serial data channel;
   a clock tree for generating a synchronous clock for synchronizing the parallel data; and
   a plurality of FIFO buffers each associated with a regenerator, each FIFO buffer for storing the respective parallel data, wherein the respective parallel data is stored in each respective FIFO buffer based on the respective data clock and the parallel data is read from the FIFO buffer based on the synchronous clock and wherein the FIFO buffers are optimized for jitter;
   each FIFO buffer of the plurality of FIFO buffers including:
      a data store having a plurality of parallel data locations for storing the parallel data in response to a location select signal and for writing the parallel data in response to a write select signal,
      a synchronous repetitive counter for generating a synchronous count for incrementally selecting each data location based on the synchronous clock;
      a demultiplexer coupled between the synchronous counter and the plurality of storage locations for enabling a selected location to store the parallel data using the select signal which is generated by the demultiplexer based on the synchronous count;
      a data repetitive counter for generating a data count for incrementally selecting each data location based on the data clock; and
      a multiplexer coupled between the data counter and the plurality of storage locations for reading the parallel data of a data location selected based on the data count;
   wherein the synchronous counter is configured to count about 180 degrees out of phase with the count of the data counter in the absence of jitter between the synchronous clock and the data clock so that the synchronizing apparatus is optimized for jitter.

2. Apparatus for synchronizing data as defined in claim 1, wherein the synchronous clock is generated by the clock tree based on one of the data clocks.

3. Apparatus for synchronizing data as defined in claim 1, wherein the FIFO buffers are implemented using CMOS circuits and further comprising a gate for gating the synchronous clock in response to a powersave signal.

4. Apparatus for synchronizing parallel data to a synchronous clock, comprising:
   a data store having a plurality of parallel data locations for storing the parallel data in response to a location select signal and for writing the parallel data in response to a write select signal,
   a synchronous repetitive counter for generating a synchronous count for incrementally selecting each data location based on a synchronous clock;
   a demultiplexer coupled between the synchronous counter and the plurality of storage locations for enabling a selected location to store the parallel data using the select signal which is generated by the demultiplexer based on the synchronous count;
   a data repetitive counter for generating a data count for incrementally selecting each data location based on a data clock;
   a multiplexer coupled between the data counter and the plurality of storage locations for reading the parallel data of a data location selected based on the data count;

wherein the synchronous counter is configured to count about 180 degrees out of phase with the count of the data counter in the absence of jitter between the synchronous clock and the data clock so that the synchronizing apparatus is optimized for jitter between the synchronous clock and the data clock.

5. Apparatus for synchronizing parallel data as defined in claim 4, further comprising a latch for latching the data read by the multiplexer.

6. Apparatus for synchronizing parallel data as defined in claim 4, further comprising a plurality of delay circuits for initializing the data store, the synchronous counter and the data counter.

7. Apparatus for synchronizing parallel data as defined in claim 4, wherein the storage locations are synchronous multiple-bit D flip-flops.

* * * * *